June 1, 1965   A. E. BERGER, JR   3,186,785
THREE MEMBER SLIDE MECHANISM FOR CABINET DRAWERS
Filed Dec. 31, 1962   2 Sheets-Sheet 2
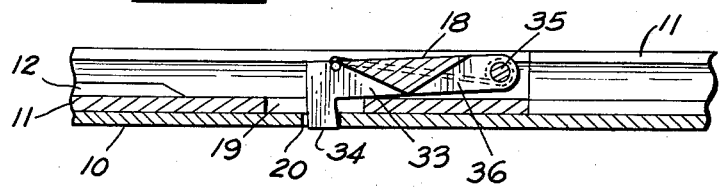
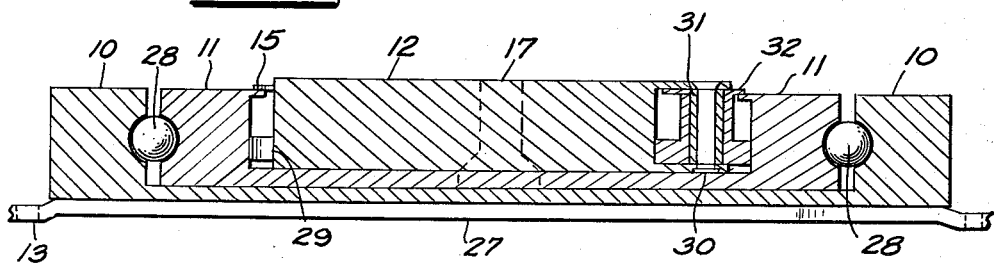
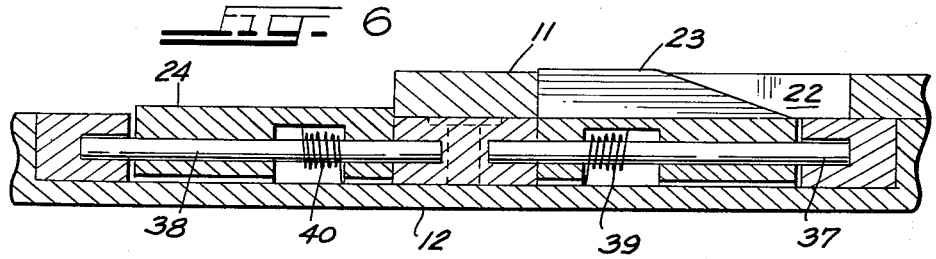
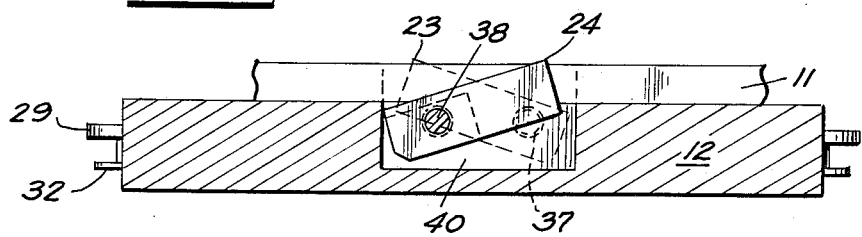
INVENTOR.
ALBERT E. BERGER, JR.
BY
J. Warren McCaffrey

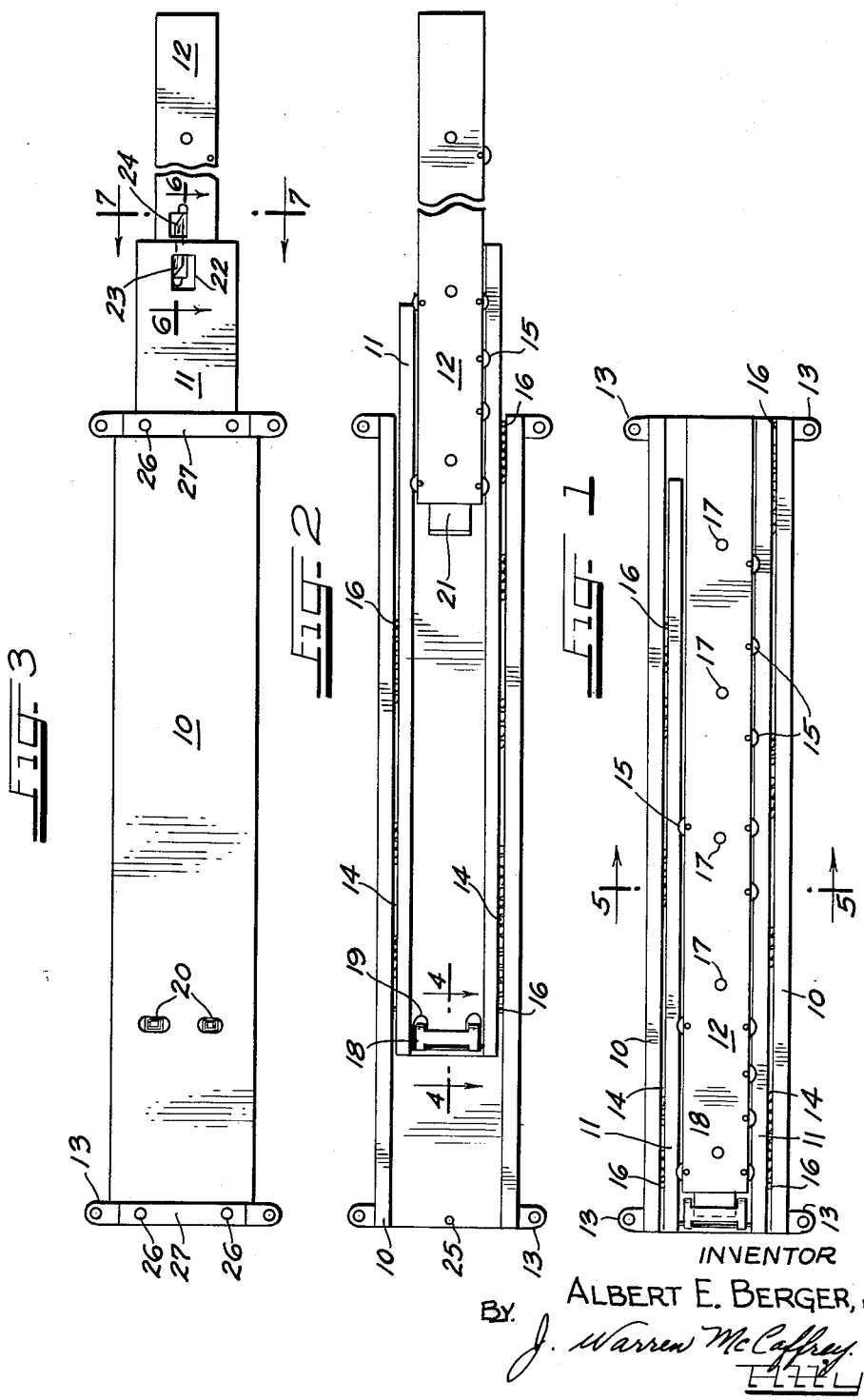

United States Patent Office 3,186,785
Patented June 1, 1965

3,186,785
THREE MEMBER SLIDE MECHANISM FOR CABINET DRAWERS
Albert E. Berger, Jr., Chicago, Ill., assignor to Austin Continental Industries, Incorporated, Chicago, Ill.
Filed Dec. 31, 1962, Ser. No. 248,570
6 Claims. (Cl. 312—339)

This invention relates to the use of smooth-moving drawers in suitable cabinets for the storage of scientific equipment and apparatus such as delicate electronic chassis.

The delicate and expensive electronic equipment must necessarily be stored in safe out-of-the-way places and preferably in containers that are not subject to bumping, knocking, and shocks of lesser intensity. These conditions require smooth in-and-out movement of drawers usually in cabinets that are placed off to the side and out of traffic so as not to be exposed to office or plant traffic or personnel movements.

There are a number of ball-bearing slide mechanisms on the market today that provide uncomplicated and smooth operation of drawers in cabinets. However, this invention relates to a ball-bearing slide mechanism to support an electronic chassis, which consists of an outside slide, an intermediate slide, and an inside slide with the inside slide attachable to said electronic chassis. In such use of the slide mechanisms they are installed in pairs and opposite to each other so that the outside slides are fastened to the inside opposite walls of the cabinet, and the inside slides are fastened to the opposite outsides of the electronic chassis.

The feature of the slide mechanism of this invention is the locking devices for the slides and the use of special roller wheels on the inside extensible slide.

The intermediate slide can be extended forward several inches when it is arrested by a pair of hinged crooked fingers mounted on said slide that are in fixed relationship and operate together and spring into two parallel holes provided in the outside slide to stop any further motion of the intermediate slide.

The inside slide is equipped with a number of flanged wheels on the top and bottom edges that are designed to convert sliding friction into rolling friction. They eliminate the use of two rails of ball-bearings and make movement of the inside extensible slide much easier than with ball-bearings.

The number and location of the flanged wheels along the top and bottom edge of the inside extensible slide can be determined by a mathematical formula depending on the weight to be carried and the forward extension desired.

The inside extensible slide has a couple of spring stops that operate to arrest the forward and backward movement of said inside slide. In a three-member slide mechanism the two spring locks are in line and countersunk in the side of the inside slide that faces the intermediate slide. The rear spring lock fits into a rectangular window in the intermediate slide when they are opposite each other and the locking stops any further extension of the inside extensible slide. The foremost end of the intermediate slide engages the forward spring lock and stops the return of the inside slide to storage position.

There are posts provided at the forward ends of the ball-bearing tracks of the outside slide and also near the rear of the ball-bearing tracks of the intermediate slide so as to confine the ball-bearings in the two ball-races formed by the tracks in the outside slide almost touching the tracks on the intermediate slide. The movement of the inside extensible slide within the intermediate slide is faciliated by the roller wheels previously described.

The three-member sliding mechanism of this invention will be better understood by a description of the accompanying drawings in which—

FIG. 1 is a vertical view of a three-member slide mechanism fully retracted in storage position as it might be mounted on the left-hand wall inside of a cabinet by means of the four lugs shown at the two ends.

FIG. 2 is a vertical view of the same mechanism in fully extended forward position.

FIG. 3 is a vertical view of the back side of the three-piece slide mechanism shown in FIG. 2 with the inner extensible slide shortened by the broken view shown for convenience in drawing.

FIG. 4 is an enlarged, sectional view along line 4—4 of FIG. 2 showing a cross section through the mechanism for locking the intermediate slide to the outside member of the three-piece slide mechanism.

FIG. 5 is a greatly enlarged, sectional view along line 5—5 of FIG. 1 showing a cross section through one of the roller wheels employed between the inner extensible slide and the intermediate extensible slide.

FIG. 6 is a greatly enlarged, sectional view along line 6—6 of FIG. 3 showing a cross section through the dual mechanism for locking the inner extensible slide to the intermediate extensible slide.

FIG. 7 is a greatly enlarged, sectional view along line 7—7 of FIG. 3 looking toward said dual locking mechanism showing the relative positions of said locking stops in relation to the intermediate slide, illustrated broken away, and to the inner slide.

In order to better understand the following specification the accompanying drawings will be described and references will be made to the several figures and the numbered parts thereof using the same numbers to identify the same elements in the several figures.

Referring to FIG. 1, the front face of the outside stationary slide which shows is numbered 10, while the front face of the intermediate extensible slide which shows is 11, and the front face of the extensible inside slide is 12. The four lugs for fastening the three-member slide mechanism to the inside wall of a cabinet are each identified 13. The upper and lower ball-bearing tracks which minimize the friction between the intermediate extensible slide 11 and the outside stationary slide 10 are each identified as 14. And the several roller wheels designed to change sliding friction into rolling friction between the intermediate extensible slide and the inside extensible slide are severally indicated by numerals 15. There are posts 16 located in each ball-bearing track 11 in order to stop the movement of the thus restricted ball-bearings. As designed there are 75 ball-bearings in the lower track and 50 in the upper. The number of ball-bearings is greater in the lower track where the weight of the drawer or chassis is greater but the exact number in each track is not a feature of the slide mechanism of this invention. The several holes 17 along the inside extensible slide are for fastening thereto a drawer, chassis or other load.

A feature of this invention is the locking mechanism generally identified as 18 which is shown in unlocked position with the slide completely retracted. When the drawer or chassis of the containing cabinet is pulled out and the intermediate extensible slide and the inside extensible slide are gradually extended forward the mechanism 18 goes into locking position at a definite extension of the intermediate slide and it becomes locked to the outside stationary slide so that it cannot be extended forward any farther. However, the inner extensible slide will extend further until its locking mechanism goes into operation which will be explained later herein.

In FIG. 2 the intermediate and inside extensible slides are shown fully extended so that the intermediate slide is locked against any farther movement either forward or backward by reason of the crooked fingers of locking mechanism 18 springing through holes 19 in the intermediate slide 11 into locking position in rectangular holes 20 in outside stationary slide 10, shown in FIG. 3. The means for releasing the spring of the locking mechanism 18 is a tongue 21 at the end of the inside slide which tapers down to a thin edge which on retraction or return to storage position slides under the cross-bar of 18 and lifts the crooked fingers out of the locking holes 20 in slide 10.

The locking of the inside extensible slide with the intermediate extensible slide, which is the case in FIG. 2 but is not shown, is illustrated in FIG. 3. The view shows the side of the ouside stationary slide that fastens onto the inside wall of the cabinet, the back of a portion of the intermediate extensible slide and the back of a portion of the inside extensible slide. There is a rectangular hole in the intermediate slide near the forward extending end identified as 22 which allows a stop 23 to spring through said hole 22 and thereby stop the movement of said inside slide forward. A similar spring stop 24 a little bit forward of stop 23 prevents the movement of said inside slide any farther rearward. Thus the inside slide is locked to the intermediate slide, and as previously described, the intermediate slide is locked by mechanism 18 to outside stationary slide 10. Thus the three-member slide mechanism is fully extended and locked in position as shown in FIG. 2 and FIG. 3 of the drawings. In FIG. 2 the face of the extension members are illustrated fully extended while in FIG. 3 the reverse side of each slide is illustrated as fully extended and locked in the extended positions.

A button-shaped stop 25 is shown on the outside slide 10 to stop the return of intermediate slide 11 to closed position. Bolts 26 are to fasten strip 27 to back of outside slide 10 which strip extends across and beyond the back of the slide to furnish lugs 13 for attaching the slide to a cabinet wall.

The way in which the three slides of this invention nest one in the other is clearly shown in FIG. 5. The inside extensible slide 12 lays in and parallel to the intermediate slide 11, which lays in and parallel to the outside stationary slide 10. Ball-bearings 28 make it easy to move the intermediate slide 11 along outside slide 10. In the mechanism of this invention there are 75 ball-bearings in the lower track and 50 ball bearings in the upper track. The exact number of the ball-bearings in each track is not a feature of this invention but there necessarily must be more ball-bearings in the lower track because they must carry the weight of the electronic chassis as smoothly as possible.

Flanged roller wheels 15 are employed to convert sliding friction into rolling friction between the inside extensible slide 12 and the intermediate slide 11. Again as in the case of the more ball-bearings being in the lower track, there are more roller wheels 15 in the lower track between the inside extensible slide 12 and the intermediate slide 11, than there are in the upper track. The number and location of the roller wheels 15 can be determined by practical formulae dealing with the variation in loads and distances a drawer or chassis may be extended. Thus in the case of a specific three slide mechanism having a 20 inch long outside stationary slide, a 20 inch long intermediate extensible slide and a 19¾ inch inside extensible slide can be extended by the construction of this invention into an extended slide totalling 56¾ inches. Such a three slide mechanism has been constructed and used, employing only three roller wheels along the upper edge spaced along the rear half thereof, while using nine roller wheels along the lower edge.

The roller wheels 15 feature a roller 29 at one side that enables the inside slide 12 to move gently and smoothly in the intermediate slide 11. They are held in place by pins 30 and rotate smoothly on said pins by reason of bearings 31. The other side of the roller which has a thin flange 32 has a smaller diameter than the diameter of roller section 29. The flange 32 keeps the roller wheel 15 in a constant position crosswise in the inside slide 12 and thus contributes a uniform smooth rolling between said thin slide 12 and the thin intermediate slide 11. Also by reason of flange 32 the movement of thin slide 12 is kept in a constant relationship within the intermediate thin slide 11, which feature also contributes to the smooth rolling between said slides.

In FIG. 4 is shown an enlarged cross-section view through the special mechanism 18 for locking the thin intermediate slide 11 to the outside slide 10. Mechanism 18 consists of an arm 33 with depending crooked fingers 34 and hinged on pin 35. A steel spring 36 wound around pin 35 keeps the arm 33 with dependent fingers 34 under tension so that when the holes 19 in intermediate slide 11 and 20 in outside slide 10 are in alignment the dependent fingers 34 spring through said holes 19 and 20 and lock said slides 10 and 11 together.

The other dual member device for locking the thin inside slide 12 to the thin intermediate slide 11 is shown in detail in the vertical cross-sectional view through the device shown in FIG. 6. The sectional view along line 6—6 of FIG. 3 is along the center lines of horizontal pins 37 and 38 and, as a result of the spring tension supplied by steel-coiled spring 39, shows cam stop 23 sprung up into locking position through rectangular hole 22 in intermediate slide 11. Likewise the cam 24 is sprung up under spring tension supplied by steel coil spring 40 but the sectional view shown through center of pin 38 and looking in the direction indicated does not appear sprung up. However, in FIG. 7 both cams 23 and 24 are shown sprung up to lock thin inside slide 12 to thin intermediate slide 11 as shown in FIG. 3.

The dual spring cam lock 23 and 24 with their steel spring tension coils 39 and 40 are built-in thin inside slide 12. The cams move about pins 37 and 38 and when not depressed under slide 11 the spring tension provided by steel coils 39 and 40 causes them to spring up out of inside slide 12 as shown in FIGURE 7. Actually, however, the slide mechanism is usually installed lengthwise so that the cross-section view of FIGURE 7 would be vertical. In that case the cams would spring out to the left rather than up.

There is only one rectangular hole 22 cut in intermediate slide 11, and the locking mechanism 23 at the rear of thin slide 11 stops the forward extension of slide 11. Hole 22 is so designed and only extends far enough in slide 10 to envelop cam 23. Thus, thin inside slide 12 is locked to thin intermediate slide 11. But thin inside slide 12 is also prevented by cam 24 from being retracted into intermediate slide 11 when it strikes the forward end of said slide 11. Thus the dual cams prevent the thin inside slide 12 from extending further forward or retracting into a storage position. To release the cams the operator presses each one down; and by pushing the inside slide first backwards on the tracks in the intermediate slide, and then pushing both the inside and intermediate slides backwards the drawer or chassis will be retracted to storage position.

What I claim as invention:

1. A slide mechanism comprising three thin slide members one of which remains stationary and has upper and lower horizontal flanged edges which extend outward so as to shape upper and lower tracks for sliding an intermediate extensible member back and forth, said intermediate member sliding between ball bearings held in said tracks, said intermediate slide member having upper and lower horizontal flanged edges which extend outward so as to shape upper and lower tracks for sliding an inside extensible member back and forth, said inside slide member having roller wheels spaced along its upper and lower horizontal edges which roll in the tracks provided by the flanged upper and lower edges of said intermediate slide member, each of said roller wheels having axial extensions to a thin flange which guides said roller along the track of the intermediate extensible slide, and a spring mechanism attached near the rear end of said intermediate slide for locking said intermediate slide member to said stationary slide member in its farthest extended relation.

2. A slide mechanism comprising three thin slide members one of which remains stationary and has upper and lower horizontal flanged edges which extend outward so as to shape upper and lower tracks for sliding an intermediate extensible member back and forth, said intermediate member sliding between ball bearings held in said tracks, said intermediate slide member having upper and lower horizontal flanged edges which extend outward so as to shape upper and lower tracks for sliding an inside extensible member back and forth, said inside slide member having roller wheels spaced along its upper and lower horizontal edges which roll in the tracks provided by the flanged upper and lower edges of said intermediate slide member, each of said roller wheels having axial extensions to a thin flange which rotates with said roller wheel and guides said roller along the track of the intermediate extensible slide, and a dual spring mechanism located near the rear end of said inside slide for locking said inside slide member to said intermediate slide member in its farthest extended relation thereto.

3. A slide mechanism comprising three thin slide members one of which remains stationary and has upper and lower horizontal flanged edges which extend outward so as to shape a track for sliding an intermediate extensible member back and forth, said intermediate slide member having upper and lower horizontal flanged edges which extend outward so as to shape a track for sliding an inside extensible member back and forth, said inside member having roller wheels spaced along its upper and lower horizontal edges which roll in the track provided by the flanged upper and lower edges of said intermediate slide member, and said roller wheels consisting of a series of same diameter rollers of the same width but each roller having an axial extension to a thin flange that is smaller in diameter than its roller and rolls outside the said tracks provided by the flanged upper and lower edges of said intermediate slide member.

4. A slide mechanism comprising three thin slide members one of which remains stationary and has upper and lower horizontal flanged edges which extend outward so as to shape a track for sliding an intermediate extensible member back and forth, said intermediate slide member having upper and lower horizontal flanged edges which extend outward so as to shape a track for sliding an inside extensible member back and forth, said inside member having roller wheels spaced along its upper and lower horizontal edges which roll in the track provided by the flanged upper and lower edges of said intermediate slide member, said roller wheels consisting of a series of same diameter rollers of the same width but each roller having an axial extension to a thin flange that is smaller in diameter than its roller and rolls outside the said tracks provided by the flanged upper and lower edges of said intermediate slide member, and a spring mechanism attached near the rear end of said intermediate slide member for locking said member to said stationary member in its farthest extended relation.

5. A slide mechanism comprising three thin slide members one of which remains stationary and has upper and lower horizontal flanged edges which extend outward so as to shape a track for sliding an intermediate extensible member back and forth, said intermediate slide member having upper and lower horizontal flanged edges which extend outward so as to shape a track for sliding an inside extensible member back and forth, said inside member having roller wheels spaced along its upper and lower horizontal edges which roll in the track provided by the flanged upper and lower edges of said intermediate slide member, said roller wheels consisting of a series of same diameter rollers of the same width but each roller having an axial extension to a thin flange that is smaller in diameter than its roller and rolls outside the said tracks provided by the flanged upper and lower edges of said intermediate slide member, a spring mechanism attached near the rear end of said intermediate slide for automatically locking said intermediate slide member to said stationary member in its farthest extended relation, and a dual spring activated cam mechanism located near the rear end of said inside slide for automatically locking said inside slide member to said intermediate slide member in its farthest extended relation thereto.

6. A slide mechanism for cabinet drawers comprising three thin slide members one of which remains stationary and has upper and lower horizontal flanged edges which extend outward so as to shape a track for sliding an intermediate extensible member back and forth, said intermediate member sliding between upper and lower ball bearings held in said track, said intermediate slide member having upper and lower horizontal flanged edges which extend outward so as to shape a track for sliding an inside extensible member back and forth, said inside member having roller wheels spaced along its upper and lower horizontal edges which roll in the track provided by the flanged upper and lower edges of said intermediate slide member, said roller wheels consisting of a series of same diameter rollers of the same width but each roller having an axial extension to a thin flange that is smaller in diameter than its roller and rolls outside the said tracks provided by the flanged upper and lower edges of said intermediate slide member, a spring mechanism attached near the rear end of said intermediate slide for automatically locking said intermediate slide member to said stationary member in its farthest extended position, and a dual spring activated cam mechanism located near the rear end of said inside slide for automatically locking said inside slide member to said intermediate slide member in its farthest extended position.

References Cited by the Examiner

UNITED STATES PATENTS

| 1,144,670 | 6/15 | Watson | 312—339 |
| 1,178,609 | 4/16 | Weiss | 312—399 |
| 1,537,067 | 5/25 | Card | 312—339 X |
| 2,862,772 | 12/58 | Gussack | 312—339 X |
| 2,809,085 | 10/57 | Fall | 312—338 X |
| 2,862,772 | 12/58 | Gussack | 312—339 X |
| 3,092,429 | 6/63 | Barnes | 312—338 X |
| 3,129,981 | 4/64 | Meyer | 308—3.6 |
| 3,133,768 | 5/64 | Klakovich | 312—323 X |

FOREIGN PATENTS 856,227  12/60  Great Britain.

FRANK B. SHERRY, *Primary Examiner.*